(12) United States Patent
Furutani et al.

(10) Patent No.: US 11,983,495 B2
(45) Date of Patent: May 14, 2024

(54) EVALUATION APPARATUS AND EVALUATION METHOD

(71) Applicant: Nippon Telegraph and Telephone Corporation, Tokyo (JP)

(72) Inventors: Takashi Furutani, Tokyo (JP); Machiko Shinozuka, Tokyo (JP); Xiaoxi Zhang, Tokyo (JP); Hiroki Oka, Tokyo (JP); Katsuya Hayashi, Tokyo (JP); Yuriko Tanaka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 352 days.

(21) Appl. No.: 17/432,981

(22) PCT Filed: Feb. 13, 2020

(86) PCT No.: PCT/JP2020/005587
§ 371 (c)(1),
(2) Date: Aug. 23, 2021

(87) PCT Pub. No.: WO2020/175156
PCT Pub. Date: Sep. 3, 2020

(65) Prior Publication Data
US 2022/0269860 A1    Aug. 25, 2022

(30) Foreign Application Priority Data
Feb. 25, 2019 (JP) .................. 2019-031682

(51) Int. Cl.
*G06F 16/35* (2019.01)
*G06F 16/31* (2019.01)
(Continued)

(52) U.S. Cl.
CPC .......... *G06F 40/289* (2020.01); *G06F 16/313* (2019.01); *G06F 16/35* (2019.01); *G06Q 10/06393* (2013.01)

(58) Field of Classification Search
None
See application file for complete search history.

(56) References Cited

U.S. PATENT DOCUMENTS

| 10,535,277 | B2* | 1/2020 | Apokatanidis ........... G09B 7/02 |
| 2007/0192081 | A1 | 8/2007 | Konno et al. |
| 2019/0026630 | A1* | 1/2019 | Ide .......................... G06F 16/00 |

FOREIGN PATENT DOCUMENTS

JP        4770495        9/2011

OTHER PUBLICATIONS

Deloitte Tohmatsu Consulting LLC, "SDGs Business Possibilities and Rule Formation," dated Dec. 2017, retrieved from URL <https://webdesk.jsa.or.jp/pdf/dev/md_3079.pdf>, 291 pages.

(Continued)

*Primary Examiner* — Quynh H Nguyen
(74) *Attorney, Agent, or Firm* — Fish & Richardson P.C.

(57) ABSTRACT

An evaluation device includes a first calculation unit configured to calculate feature quantities of respective words, the feature quantities corresponding to text data in which a target of any goal of the SDGs is described and text data in which an outline of one or more first services for which a contribution to the goal that is clear is described, a generation unit configured to generate a sentence feature matrix based on the feature quantities of the respective words, a second calculation unit configured to calculate, when text data in which an outline of a second service is described is input, feature quantities of respective words, and an evaluation unit configured to evaluate a degree of a contribution of the second service to the goal based on the feature (Continued)

quantities of the respective words relevant to the second service and the sentence feature matrix.

5 Claims, 8 Drawing Sheets

(51) Int. Cl.
    *G06F 40/289*     (2020.01)
    *G06Q 10/0639*     (2023.01)

(56) References Cited

OTHER PUBLICATIONS gesi.org, "# System Transformation—How Digital Solution Will Drive Progress Towards the Sustainable Development Goals," Global e-Sustainability Initiative(GeSI), dated Jun. 11, 2016, retrieved from URL <http://systemtransformation-sdg.gesi.org/160608_GeSI_SystemTransformation.pdf>, 21 pages.

* cited by examiner

| GOAL 1 | | TARGET OF GOAL 1 |
|---|---|---|
| Let us eliminate poverty: Putting an end to poverty everywhere in all its forms | 1.1 | By 2030, end extreme poverty—defined as people currently living on less than 1.25 dollars per day—everywhere. |
| | 1.2 | By 2030, halve the percentage of men, women, and children of all ages in all dimensions of poverty as defined by each country. |
| | 1.3 | Implement in each country appropriate social protection systems and measures that include minimum standards, and by 2030, achieve sufficient protection of the poor and vulnerable. |
| | 1.4 | By 2030, starting with the poor and vulnerable, ensure equal rights for all men and women regarding economic resources and management of basic services, ownership, land and other assets, inheritances, natural resources, appropriate new technologies, and financial services including microfinancing. |
| | 1.5 | By 2030, build the resilience of people in impoverished and vulnerable circumstances and mitigate their levels of risk and their vulnerability in the face of extreme weather phenomena associated with climate change and other economic, social, and environmental damage and disasters. |
| | 1.a | Ensure the mobilization of vast resources from various supply sources via reinforcing developmental cooperation and the like to take appropriate and predictable measures for least developed countries and other developing countries in order to implement plans and policies for eradicating poverty in all dimensions. |
| | 1.b | Establish, in each country, region, and on an international level, appropriate policy frameworks based on developmental strategies accounting for the poor and for gender, and support increased investment in actions for eradicating poverty. |

Fig. 4

By 2030, end extreme poverty—defined as people currently living on less than 1.25 dollars per day—everywhere.

2030 2030 2030 undefined term 15 other 1*0*0 NIL
year year year noun 6 temporal noun 10*0*0 "representative orthography: year/year kanji reading: *kun* quasi-temporal noun category: time"
@ year year year noun 6 temporal noun 10*0*0 "representative orthography: year/year kanji reading: *on* quasi-temporal noun category: time"
by by particle 9 case particle 1*0*0 NIL
@ by by by particle 9 adverbial particle 2*0*0 NIL
*ni ni ni* particle 9 case particle 1*0*0 NIL
, , , special 1 comma 2*0*0 NIL
currently currently currently noun 6 temporal noun 10*0*0 "representative orthography: currently/currently category: time"
1 1 1 undefined term 15 other 1*0*0 NIL
day day day noun 6 temporal noun 10*0*0 "representative orthography: day/day kanji reading: *on* category: time"
@ day day day noun 6 temporal noun 10*0*0 "representative orthography: day/day kanji reading: *kun* quasi-temporal noun category: time"
@ JP JP JP noun 6 toponym 4*0*0 "representative orthography: JP/JP toponym: country: abbreviation: Japan"
1.25 1.25 1.25 undefined term 15 other 1*0*0 NIL
dollars dollars dollars noun 6 common noun 1*0*0 "representative orthography: dollars/dollars category: quantity domain: business"
less than less than less than suffix 14 noun-like noun suffix 2*0*0 "representative orthography: less than / less than"
on on on particle 9 case particle 1*0*0 NIL
living living living noun 6 *suru* noun 2*0*0 "representative orthography: living/living category: abstract object domain: home and dwelling"
do do do verb 2*0 *suru* verb 16 infinitive 2 "representative orthography: do/do auxiliary verb candidate (infinitive) transitive/intransitive verb: intransitive: become/become"
people people people noun 6 common noun 1*0*0 "representative orthography: people/people category: people"
as as particle 9 case particle 1*0*0 NIL
defined defined defined noun 6 *suru* noun 2*0*0 "representative orthography: defined/defined category: abstract object domain: science and technology"
do do do verb 2*0 *suru* verb 16 imperfective 3 "representative orthography: do/do auxiliary verb candidate (infinitive) transitive/intransitive: intransitive: become/become"
*rete rete rete* suffix 14 verb-like suffix 7 vowel-stem verb 1 *ta*-continuative *te* form 14 "representative orthography: *reru/reru*"
is is is suffix 14 verb-like suffix 7 vowel-stem verb 1 infinitive 2 "representative orthography: is/is"
extreme extreme extreme adjective 3*0 *na*- and *no*-adjectives 22 *da*-row special continuative 4 "representative orthography: is extreme / is extreme"
poverty poverty is poor adjective 3*0 *na*-adjective 21 stem 1 "representative orthography: is poor / is poor"
*o o o* particle 9 case particle 1*0*0 NIL
all all all attributive 11*0*0*0 "representative orthography: all/all"
places places places noun 6 common noun 1*0*0 "representative orthography: places/places category: places—other"
in in in particle 9 case particle 1*0*0 NIL
end end end verb 2*0 consonant-stem verb *ra*-row 10 imperfective 3 "representative orthography: end/end auxiliary verb candidate (infinitive) transitive/intransitive: transitive: end/antonym: verb: start/start"
*seru seru seru* suffix 14 verb-like suffix 7 vowel-stem verb 1 infinitive 2 "representative orthography: *seru/seru*"
. . . special 1 period 1*0*0 NIL
EOS

Fig. 5

| NOUN | SCORE | FREQUENCY OF APPEARANCE |
|---|---|---|
| the poor | 9.29 | 4 |
| vulnerable | 9.29 | 4 |
| poor | 1.04 | 3 |
| each country | 1.25 | 3 |
| appropriate | 1.54 | 3 |
| people | 0.12 | 3 |
| define | 0.32 | 2 |
| dimension | 0.29 | 2 |
| protect | 0.12 | 2 |
| eradicate | 0.97 | 2 |
| extreme | 0.58 | 1 |
| poverty | 1 | 1 |
| ⋮ | ⋮ | ⋮ |

Fig. 6

$$X = \begin{array}{c} \\ \\ \\ \text{CATEGORY 1} \\ \\ \text{CATEGORY 2} \\ \\ \vdots \\ \\ \text{CATEGORY 17} \end{array} \begin{array}{c} \text{the poor} \quad \text{vulnerable} \quad \text{poor} \quad \text{each country} \quad \cdots \\ \begin{bmatrix} 0.2 & 0.0 & 0.1 & \cdots \\ 0.0 & 0.0 & 0.2 & \cdots \\ \vdots & \vdots & \vdots & \vdots \\ 0.0 & 0.1 & 0.0 & \cdots \end{bmatrix} \end{array}$$

Fig. 7

EVALUATION APPARATUS AND EVALUATION METHOD

CROSS-REFERENCE TO RELATED APPLICATIONS

This application is a National Stage application under 35 U.S.C. § 371 of International Application No. PCT/JP2020/005587, having an International Filing Date of Feb. 13, 2020, which claims priority to Japanese Application Serial No. 2019-031682, filed on Feb. 25, 2019. The disclosure of the prior application is considered part of the disclosure of this application, and is incorporated in its entirety into this application.

TECHNICAL FIELD

The present invention relates to an evaluation device and an evaluation method.

BACKGROUND ART

In 2015, "2030 Agenda for Sustainable Development" focusing on sustainable development goals (SDGs) was adopted at the United Nations Summit. The SDGs includes 17 goals and 169 targets, and cover a wide range of topics from, for example, development support for developing countries in issues such as poverty, hunger, health, education, and water safety, to job satisfaction, economic growth, energy, climate change, and biodiversity.

Contributions to social issues such as the SDGs are regarded as markets that bring great business opportunities, and many companies have begun to consider solutions for each goal (for example, Non Patent Literature 1). In particular, information and communication technology (ICT) service and solution is expected to greatly contribute to solving these social issues (Non Patent Literature 2).

CITATION LIST

Patent Literature

[Patent Literature 1] JP 4770495B

Non Patent Literature

[Non Patent Literature 1] "Possibility and Rule Formation of SDGs Business," [online], Internet <URL: https://www.jsa.or.jp/datas/media/10000/md_3079.pdf>
[Non Patent Literature 2] GeSI, "#System Transformation-HOW DIGITAL SOLUTION WILL DRIVE PROGRESS TOWARDS THE SUSTAINABLE DEVELOPMENT GOALS," [online], Internet <URL: http://systemtransformation-sdg.gesi.org/160608_GeSI_SystemTransformation.pdf

SUMMARY OF THE INVENTION

Technical Problem

However, in order to determine to which goal of SDGs a service such as the ICT service and solution can contribute, it is necessary to understand knowledge regarding the content of the SDGs, and effects and environmental impacts of the ICT service and solution, and to model and analyze causal relationships between them. That is, such a determination is difficult, except for an expert who has not only knowledge regarding detailed content of the SDGs, but also knowledge regarding the effects and environmental impacts of the ICT service and solution.

For example, in the related art, analysis can be performed using a scheme such as a causal relationship diagram or system dynamics in order to ascertain a social structure or a system structure, and each evaluation target (for example, the ICT service and solution) needs to be analyzed by an expert.

Further, Patent Literature 1 discloses a technology for modeling a causal relationship of a phenomenon relevant to social and economic problems in order to contribute to a determination of a solution to the problems. Because the technology of Patent Literature 1 requires manual work, expertise in climate change is required to model and analyze phenomena and risks relevant to climate change. Further, expertise regarding effects and environmental impacts of an ICT solution is required in order to associate analysis results with the ICT solution.

However, because designers or proposers of the ICT services and solutions often do not necessarily have specialized knowledge regarding effects and environmental impacts of the ICT services and solutions, this prevents designing a service for solving social issues.

The present invention has been made in view of the above points, and an object of the present invention is to make it possible to evaluate a degree of a contribution to goals of the SDGs.

Means for Solving the Problem

Thus, in order to solve the above problems, an evaluation device includes a first calculation unit configured to calculate feature quantities of respective words, the feature quantities being regarding text data in which a target of any of goals of the SDGs is described and text data in which an outline of one or more first services a contribution of which to the goal is clear is described, the respective words being included in the text data; a generation unit configured to generate a sentence feature matrix based on the feature quantities of the respective words; a second calculation unit configured to calculate, when text data in which an outline of a second service is described is input, feature quantities of respective words regarding the text data, the respective words being included in the text data; and an evaluation unit configured to evaluate a degree of a contribution of the second service to the goal based on the feature quantities of the respective words relevant to the second service and the sentence feature matrix.

Effects of the Invention

An object is to make it possible to evaluate a degree of a contribution to goals of the SDGs.

BRIEF DESCRIPTION OF DRAWINGS

FIG. 4 is a diagram illustrating an example of text data in which details of Goal 1 of the SDGs are described.

FIG. 5 is a diagram illustrating an example of a result of morphological analysis.

FIG. 6 is a diagram illustrating an example of a calculation result of a word feature quantity.

FIG. 7 is a diagram illustrating an example of a sentence feature matrix X.

DESCRIPTION OF EMBODIMENTS

Figure 1:
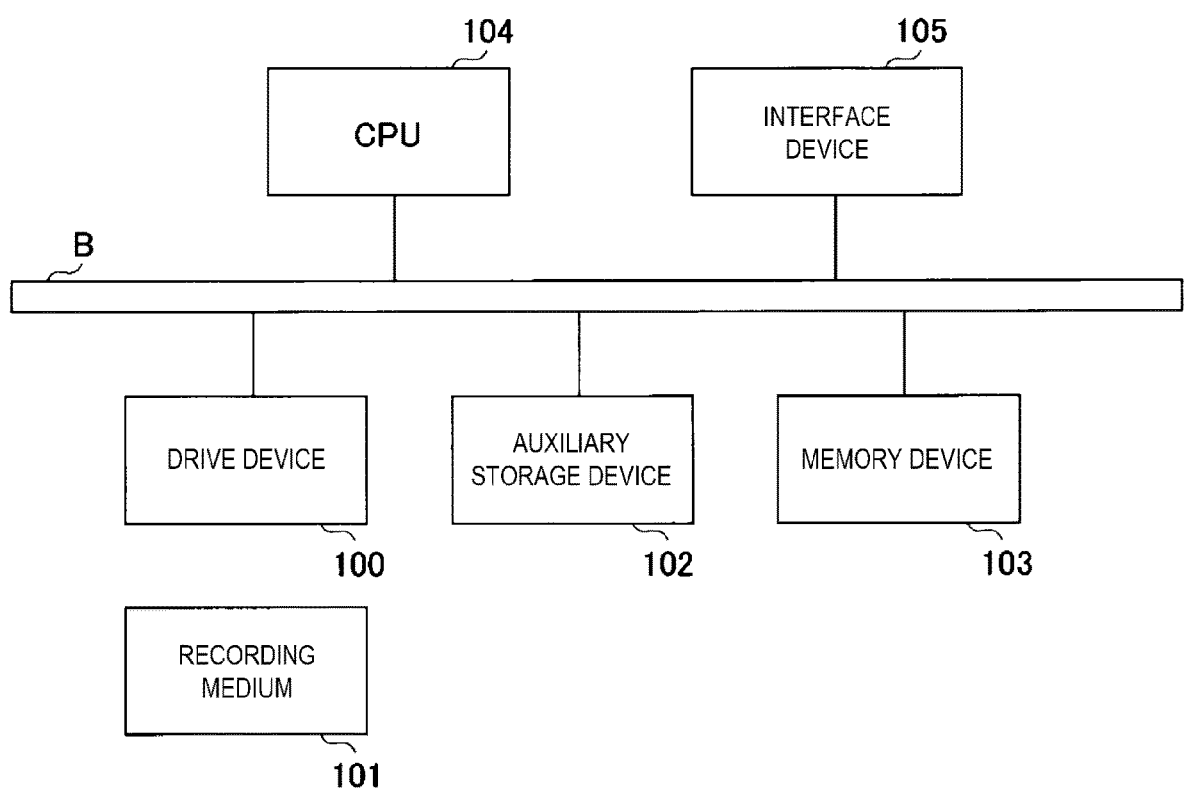
FIG. 1 is a diagram illustrating a hardware configuration example of an evaluation device 10 according to an embodiment of the present invention.

Hereinafter, embodiments of the present invention will be described with reference to the drawings. FIG. 1 is a diagram illustrating a hardware configuration example of an evaluation device 10 according to an embodiment of the present invention. The evaluation device 10 of FIG. 1 includes, for example, a drive device 100, an auxiliary storage device 102, a memory device 103, a CPU 104, and an interface device 105, which are connected to each other by a bus B.

A program that realizes processing in the evaluation device 10 is provided on a recording medium 101 such as a CD-ROM. When the recording medium 101 storing the program is set in the drive device 100, the program is installed in the auxiliary storage device 102 from the recording medium 101 via the drive device 100. However, the program does not necessarily have to be installed from the recording medium 101, and may be downloaded from another computer via a network. The auxiliary storage device 102 stores the installed program and also stores necessary files, data, and the like.

The memory device 103 reads and stores the program from the auxiliary storage device 102 when there is an instruction to start the program. The CPU 104 executes the function relevant to the evaluation device 10 according to the program stored in the memory device 103. The interface device 105 is used as an interface for connection to a network.

Figure 2:
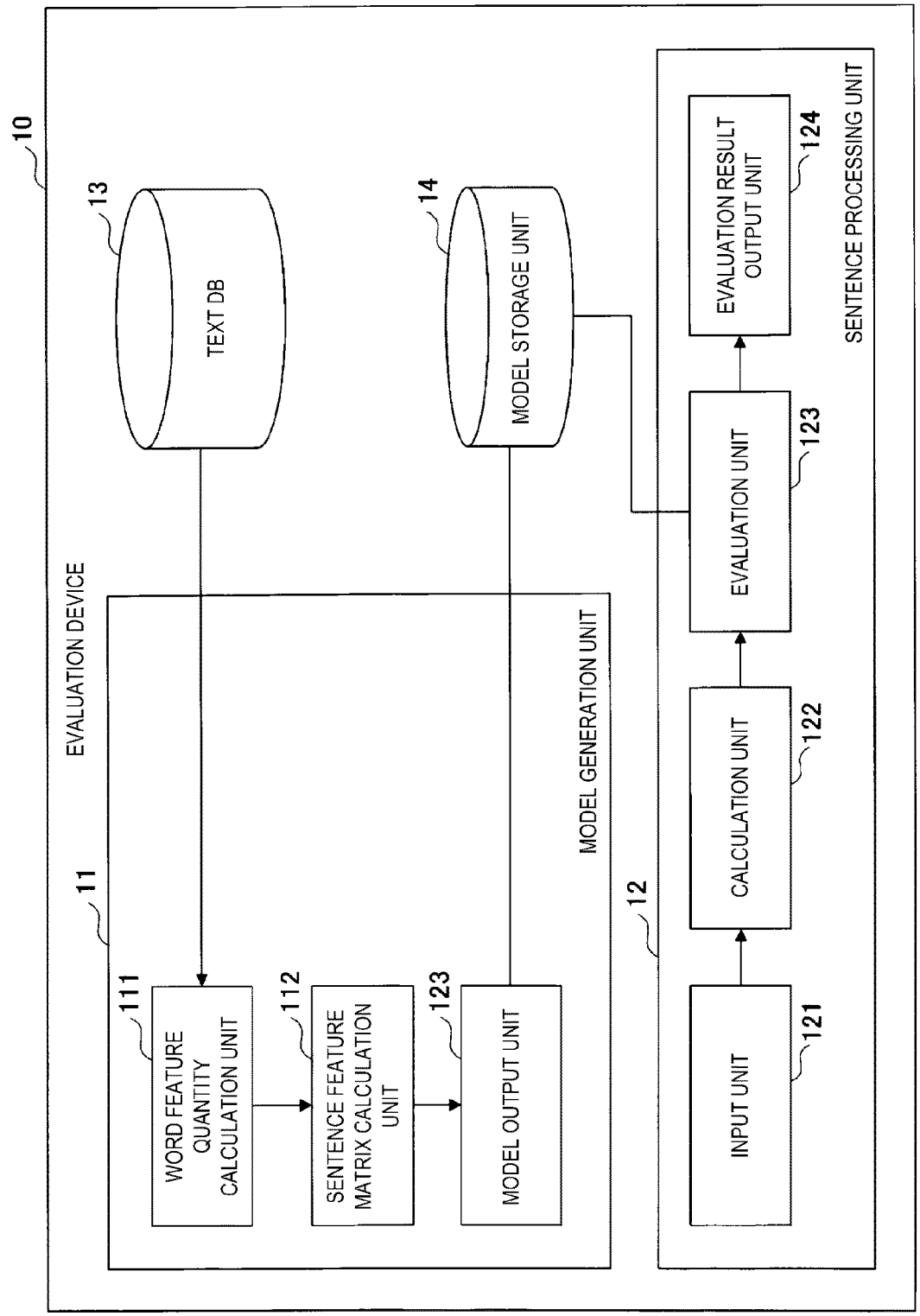
FIG. 2 is a diagram illustrating a functional configuration example of the evaluation device 10 according to the embodiment of the present invention.

FIG. 2 is a diagram illustrating a functional configuration example of the evaluation device 10 according to the embodiment of the present invention. In FIG. 2, the evaluation device 10 includes a model generation unit 11, a document processing unit 12, and the like. One or more programs installed in the evaluation device 10 cause the CPU 104 to execute processing, thereby these units are attained. Further, the evaluation device 10 uses storage units such as a text DB 13 and a model storage unit 14. Each of these storage units can be attained by using, for example, a storage device that can be connected to the auxiliary storage device 102 or the evaluation device 10 via the network.

The model generation unit 11 generates a model indicating strength of relevance for each word with respect to each of SDGs based on a feature quantity of each word extracted from text data in which details of each goal of the SDGs are described, and text data in which a function outline of an ICT service or solution (hereinafter simply referred to as a "service") a contribution of which to any goal of the SDGs is already clear is described. The text data is stored in the text DB 13. In FIG. 2, the model generation unit 11 includes a word feature quantity calculation unit 111, a sentence feature matrix calculation unit 112, and a model output unit 113.

The document processing unit 12 receives text data of a service designated as an evaluation target, extracts a feature quantity of each word from the text data, and evaluates a degree of a contribution (sight) of the evaluation target service to each goal of the SDGs using the extracted feature quantity and the model stored in the model storage unit 14. In FIG. 2, the document processing unit 12 includes an input unit 121, a calculation unit 122, an evaluation unit 123, and an evaluation result output unit 124.

Figure 3:
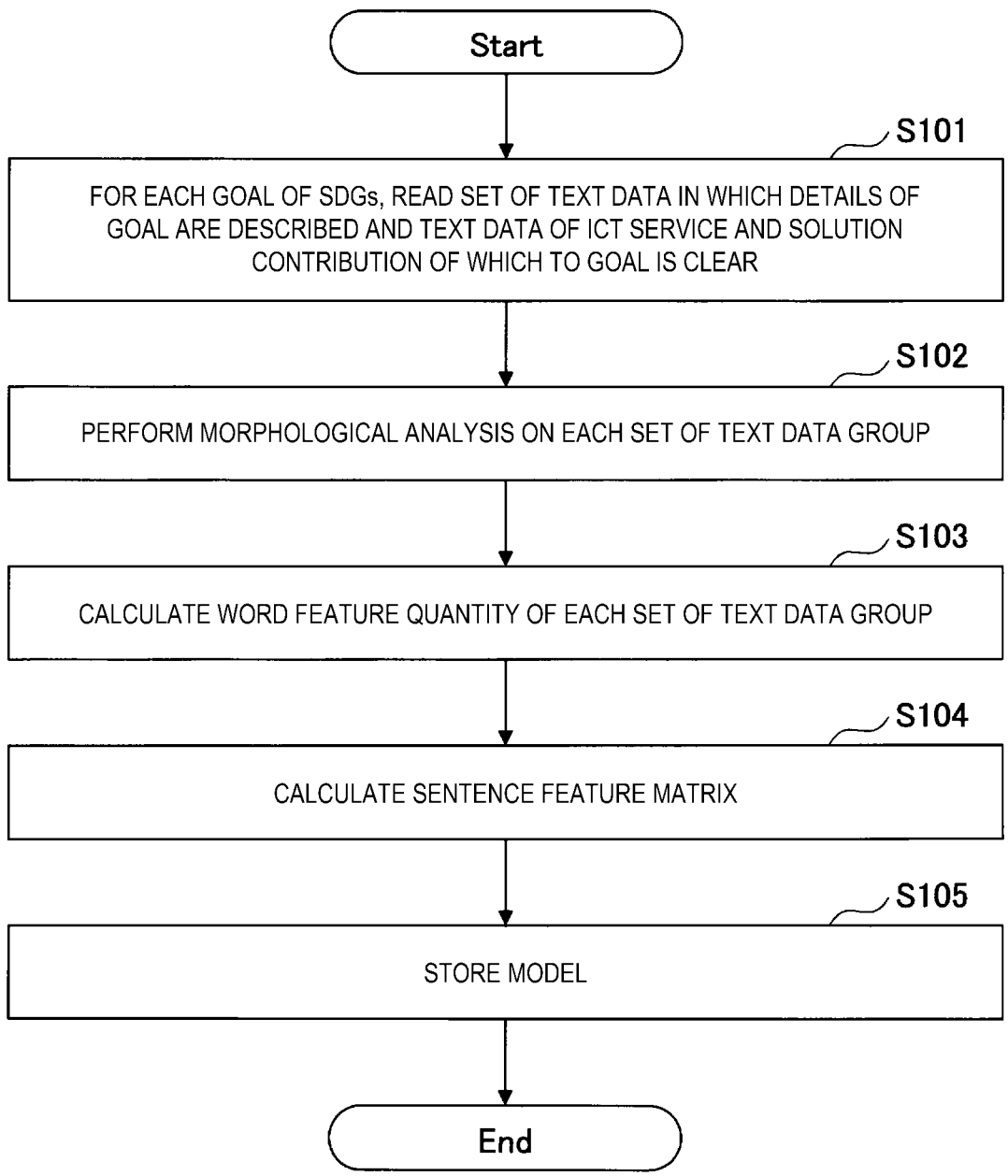
FIG. 3 is a flowchart illustrating an example of a processing procedure that is executed by a model generation unit 11.

Hereinafter, a processing procedure that is executed by the evaluation device 10 will be described. FIG. 3 is a flowchart illustrating an example of a processing procedure that is executed by the model generation unit 11.

In step S101, the word feature quantity calculation unit 111 reads, for each of a plurality of (17) goals of the SDGs, text data in which details (target) of the goal are described, and text data in which a function outline of a service a contribution of which to the goal is already clear is described. To which goal of the SDGs each service, a contribution of which to any goal of the SDGs is clear, contributes (that is, association between the goal and the service) is stored, for example, in the auxiliary storage device 102.

FIG. 4 is a diagram illustrating an example of text data in which the details of Goal 1 of the SDGs are described. As illustrated in FIG. 4, the text data of Goal 1 includes a sentence indicating each target of Goal 1. For convenience, in FIG. 4, a sentence indicating Goal 1 ("Let us eliminate poverty: Putting an end to poverty everywhere in all its forms") is also included, but the sentence may not be included in the text data. That is, it is only required that the sentence of each target be included in the text data. Text data of each of Goals 2 to 17 has a similar structure.

For example, when a service A and a service B contribute to Goal 1, the text data of Goal 1 and the text data in which a function outline of each of the service A and the service B is described are read as a set. When the service A also contributes to Goal 2, the text data of the service A and the text data of goal 2 are read as a set. The SDGs have 17 goals. Thus, in step S101, for each of the 17 goals, a set of text data of the goal and text data of one or more services contributing to the goal is read.

The text data in which the function outline of the service is described may be text data including, for example, a few sentences described in a Web page, pamphlet, or the like for introducing the service (for example, "XXX service is a service for performing YYY").

Subsequently, the word feature quantity calculation unit 111 performs, for each of 17 sets, morphological analysis of each sentence included in a text data group belonging to the set (S102).

FIG. 5 is a diagram illustrating an example of a result of the morphological analysis. FIG. 5 illustrates an example of the result of the morphological analysis for one sentence "By 2030, end extreme poverty defined as people currently living on less than 1.25 dollars per day everywhere" that is one target of Goal 1. Words included in each sentence are extracted by the morphological analysis. The morphological analysis may be performed using a known technology.

Subsequently, the word feature quantity calculation unit 111 calculates, for each of the 17 sets, a word feature quantity regarding the text data group belonging to the set for each word extracted by the morphological analysis for the set (S103).

FIG. 6 is a diagram illustrating an example of a calculation result of each word feature quantity. FIG. 6 illustrates an example of a calculation result of each word feature quantity of the set of the text data group regarding Goal 1. That is, for each word (each noun) extracted from the text data of Goal 1 and the text data of each service a contribution of which to Goal 1 is clear, a score and a frequency of appearance in the set of the text data are calculated as a word feature quantity. The score can be calculated using, for example, a TF-IDF method.

The word feature quantities are calculated similarly for each set of Goals 2 to 17. Thus, 17 calculation results of the word feature quantities can be obtained.

Subsequently, the sentence feature matrix calculation unit 112 calculates (generates) one sentence feature matrix X based on the 17 calculation results obtained in step S103 (S104). For the calculation of the sentence feature matrix X, for example, a known technology such as latent semantic analysis (LSA) or latent dirichlet allocation (LDA) can be used.

FIG. 7 is a diagram illustrating an example of the sentence feature matrix X. In the sentence feature matrix X of FIG. 7, categories 1 to 17 correspond to Goals 1 to 17. That is, the rows correspond to the goals. Each column corresponds to a word extracted from the text data group of each goal. An element of the matrix is a probability frequency indicating strength of relevance between the word and the goal. In the present embodiment, the sentence feature matrix X is an example of a model indicating relevance between the respective words and the goals.

Subsequently, the model output unit 113 stores the model (content of the sentence probability matrix X) in the model storage unit 14 (S105). For example, a probability frequency of each goal and each word is stored in the model storage unit 14 in association with each other.

Figure 8:
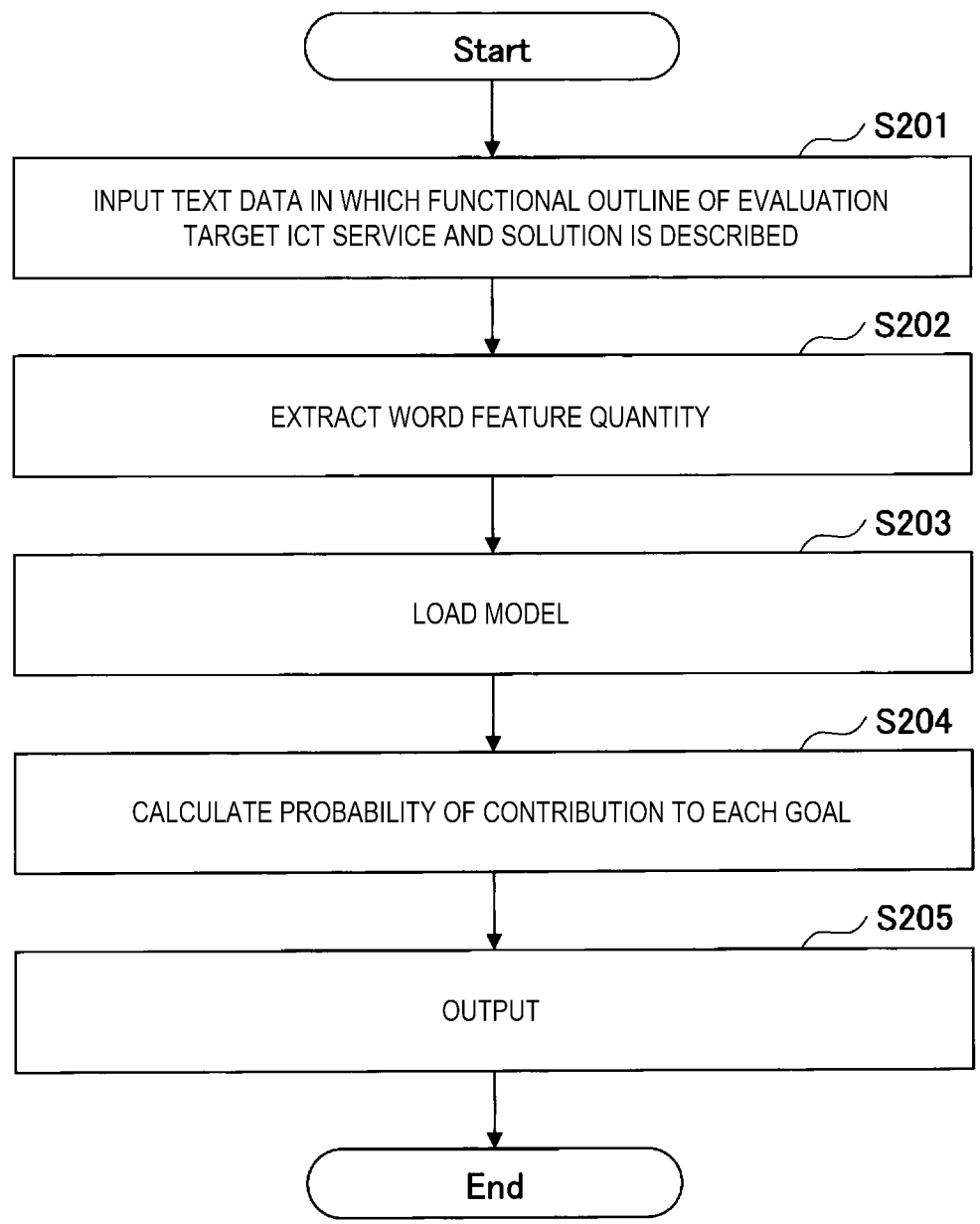
FIG. 8 is a flowchart illustrating an example of a processing procedure that is executed by a document processing unit 12.

FIG. 8 is a flowchart illustrating an example of a processing procedure that is executed by the document processing unit 12.

In step S201, the input unit 121 receives an input of text data in which the function outline of the evaluation target service is described.

Subsequently, the calculation unit 122 extracts the word feature quantities from the text data (S202). The word feature quantities may be extracted according to the same procedure as in steps S102 and S103 in FIG. 3. Thus, the word feature quantities as illustrated in FIG. 6 are extracted from the words included in the text data.

Subsequently, the evaluation unit 123 reads the model (sentence feature matrix X (FIG. 7)) from the model storage unit 14 (S203).

Subsequently, the evaluation unit 123 calculates a contribution probability for each row (that is, for each goal) of the sentence feature matrix X using a scheme such as a known topic model based on the word feature quantity extracted in step S202 and the sentence feature matrix X (S204). Each contribution probability is an example of an index indicating a degree of a contribution of the evaluation target service to each goal. The evaluation unit 123 may determine (evaluate) each contribution probability as it is as the degree of a contribution to each goal. Otherwise, the evaluation unit 123 may determine (evaluate) a goal relevant to a contribution probability equal to or higher than a threshold value as a goal to which the evaluation target service contributes, and a goal relevant to a contribution probability lower than the threshold value as a goal to which the evaluation target service does not contribute.

Subsequently, the evaluation result output unit 124 outputs an evaluation result of the evaluation unit 123 (S205). For example, the determination result may be displayed on a display device, or may be stored in the auxiliary storage device 102 or the like.

As described above, according to the embodiment, it is possible to evaluate a degree of a contribution to the goals of the SDGs. That is, the model is generated based on the text data in which the target of each goal is described and the text data in which the outline of the service the contribution of which to each goal is clear is described. Thus, when an evaluator creates text data of the evaluation target service, the evaluator can obtain an evaluation result for the degree of the contribution of this service to each goal of the SDGs. Accordingly, for example, it is possible for a company to appeal a service for each goal of the SDGs.

In the embodiment, the evaluation device 10 is an example of a calculation device. The word feature quantity calculation unit 111 is an example of a first calculation unit. The sentence feature matrix calculation unit 112 is an example of the model generation unit 11. The calculation unit 122 is an example of a second calculation unit. The evaluation unit 123 is an example of a third calculation unit.

Although embodiments of the present invention have been described in detail above, the present invention is not limited to such specific embodiments, and various modifications and changes can be made within the scope of the gist of the present invention described in the claims.

REFERENCE SIGNS LIST

10 Evaluation device
11 Model generation unit
12 Document processing unit
13 Text DB
14 Model storage unit
100 Drive device
101 Recording medium
102 Auxiliary storage device
103 Memory device
104 CPU
105 Interface device
111 Word feature quantity calculation unit
112 Sentence feature matrix calculation unit
113 Model output unit
121 Input unit
122 Calculation unit
123 Evaluation unit
124 Evaluation result output unit
B Bus

The invention claimed is:

1. An evaluation device comprising a storage device storing instructions and a processor configured to execute the instructions to perform operations comprising:
for each goal in a plurality of sustainable development goals (SDGs), obtaining first text data comprising (i) text describing targets for the respective goal, and (ii) text describing function outlines of one or more first information and communication technology (ICT) services, wherein the respective outlines have been determined to describe contributions to the respective goal;
for each goal in the plurality of SDGs, performing a morphological analysis of the first text data to extract a set of words, and computing a respective feature quantity for each word extracted from the first text data;
applying one or more of a latent semantic analysis (LSA) or a latent dirichlet allocation (LDA) to the feature quantities computed for the extracted words to generate a sentence feature matrix;
obtaining second text data describing an outline of a second ICT service, and computing the feature quantities of words in the second text data;
applying topic modeling to the sentence feature matrix and the feature quantities computed for the words in the second text data to evaluate a respective degree of contribution of the second ICT service to each goal in the SDGs; and displaying the degree of contribution of the second ICT service to the SDGs on a display device.

2. The evaluation device according to claim 1, wherein each element of the sentence feature matrix represents a respective probability frequency of one of the SDGs and a word extracted from the first text data.

3. The evaluation device according to claim 1, wherein computing the respective feature quantity for each word extracted from the first text data compromise:

applying Term Frequency-Inverse Document Frequency (TF-IDF) analysis to the first text data to determine, for each extracted word, a respective importance score and a respective frequency of appearance.

4. An evaluation method implemented by a computer, the evaluation method comprising:

for each goal in a plurality of sustainable development goals (SDGs), obtaining first text data comprising (i) text describing targets for the respective goal, and (ii) text describing function outlines of one or more first information and communication technology (ICT) services, wherein the respective outlines have been determined to describe contributions to the respective goal;

for each goal in the plurality of SDGs, performing a morphological analysis of the first text data to extract a set of words, and computing a respective feature quantity for each extracted word;

applying one or more of a latent semantic analysis (LSA) or a latent dirichlet allocation (LDA) to the feature quantities computed for the extracted words to generate a sentence feature matrix;

obtaining second text data describing an outline of a second ICT service, and computing the feature quantities of words in the second text data;

applying topic modeling to the sentence feature matrix and the feature quantities computed for the words in the second text data to evaluate a respective degree of contribution of the second ICT service to each goal in the SDGs; and displaying the degree of contribution of the second ICT service to the SDGs on a display device.

5. The evaluation method according to claim 4, wherein each element of the sentence feature matrix represents a respective probability frequency of one of the SDGs and a word extracted from the first text data.

\* \* \* \* \*